United States Patent
Kunigk

(10) Patent No.: US 10,323,385 B2
(45) Date of Patent: Jun. 18, 2019

(54) HYDRAULIC ACTUATOR

(71) Applicant: Caterpillar Global Mining LLC, Oak Creek, WI (US)

(72) Inventor: Martin Kunigk, Bochum (DE)

(73) Assignee: Caterpillar Global Mining HMS GmbH, Dortmund (DE)

( * ) Notice: Subject to any disclaimer, the term of this patent is extended or adjusted under 35 U.S.C. 154(b) by 669 days.

(21) Appl. No.: 14/773,610

(22) PCT Filed: Mar. 7, 2014

(86) PCT No.: PCT/US2014/021515
§ 371 (c)(1),
(2) Date: Sep. 8, 2015

(87) PCT Pub. No.: WO2014/149918
PCT Pub. Date: Sep. 25, 2014

(65) Prior Publication Data
US 2016/0024756 A1    Jan. 28, 2016

(30) Foreign Application Priority Data
Mar. 21, 2013 (EP) .................................... 13160481

(51) Int. Cl.
*E02F 9/22* (2006.01)
*F15B 15/14* (2006.01)
*F16C 11/04* (2006.01)

(52) U.S. Cl.
CPC ........ *E02F 9/2271* (2013.01); *F15B 15/1447* (2013.01); *F15B 15/1457* (2013.01); *F16C 11/045* (2013.01)

(58) Field of Classification Search
CPC ................ E02F 9/2271; F15B 15/1447; F15B 15/1457; F16C 11/045; F16D 1/033;
(Continued)

(56) References Cited

U.S. PATENT DOCUMENTS 3,427,826 A * 2/1969 Anderson ................ F16D 3/50
192/101
3,884,452 A * 5/1975 Britten ................ B29C 45/125
366/100
(Continued)

FOREIGN PATENT DOCUMENTS

DE    3604610    8/1987
DE    4213478    1/1993
(Continued)

OTHER PUBLICATIONS

International Search Report dated Jun. 3, 2014, in International Patent Application No. PCT/US2014/021515 by the European Patent Office (3 pages).
(Continued)

*Primary Examiner* — Amber R Anderson
*Assistant Examiner* — Nahid Amiri

(57) ABSTRACT

A hydraulic actuator is disclosed. The hydraulic actuator may have a cylinder barrel. The hydraulic actuator may also have a piston rod reciprocally received by the cylinder barrel. The piston rod may have at least one first piston rod end extending out of the cylinder barrel. The hydraulic actuator may further have an intermediate element attached to the at least one first piston rod end by a first set of screws extending in a first direction. In addition, the hydraulic actuator may have a connecting element attached to the intermediate element by a second set of screws extending in a second direction opposite to the first direction.

12 Claims, 4 Drawing Sheets

(58) Field of Classification Search
CPC ...... F16D 1/06; F16D 1/076; F16D 2001/062;
Y10T 403/10; Y10T 403/4691; Y10T
403/556; Y10T 403/57; Y10T 403/5741;
Y10T 403/645; Y10T 403/64; Y10T
403/642; F04B 53/147; F04B 53/22
USPC .................................... 403/35–37; 92/128
See application file for complete search history.

(56) References Cited

U.S. PATENT DOCUMENTS

| | | | | |
|---|---|---|---|---|
| 4,922,805 | A | * | 5/1990 | Beswick ............ F15B 15/1433 403/342 |
| 6,302,611 | B1 | | 10/2001 | de Gier et al. |
| 6,530,718 | B2 | * | 3/2003 | Nygren ................ B64G 1/645 403/337 |
| 6,725,761 | B1 | * | 4/2004 | McNaughton ...... F15B 15/2807 92/5 R |
| 7,963,716 | B2 | | 6/2011 | Yamasaki |
| 2010/0095839 | A1 | | 4/2010 | Rhoades |

FOREIGN PATENT DOCUMENTS

| | | |
|---|---|---|
| DE | 202005005477 U1 | 6/2005 |
| EP | 0252208 A1 | 1/1988 |
| JP | S54-077891 U | 6/1979 |
| JP | S55-126006 U | 9/1980 |
| JP | H08-260752 A | 10/1996 |
| JP | 09-041418 | 2/1997 |
| JP | 2005-121141 A | 5/2005 |
| JP | 2008-190544 A | 8/2008 |
| JP | 2011-007282 A | 1/2011 |

OTHER PUBLICATIONS

European Search report dated Aug. 16, 2013 in European Patent Application No. EP 13160481 by the European Patent Office (3 pages).

* cited by examiner

HYDRAULIC ACTUATOR

CLAIM FOR PRIORITY

This application is a U.S. National Phase entry under 35 U.S.C. § 371 from PCT International Application No. PCT/US2014/021515, filed Mar. 7, 2014, which claims benefit of priority of European Patent Application No. EP 13160481.1, filed Mar. 21, 2013, all of which are incorporated herein by reference.

TECHNICAL FIELD

The present disclosure generally relates to a hydraulic actuator comprising a connecting element and, particularly, to a hydraulic actuator used in a construction machine or a mining shovel.

BACKGROUND

Hydraulic actuators may be generally used to move, for instance, a boom of a construction machine, such as an excavator. The hydraulic actuator may include a cylinder barrel configured to reciprocally receive a piston rod having at least one end extending out of the cylinder barrel. For example, the cylinder barrel may be fixedly attached to, for instance, a superstructure of an excavator, and the piston end extending out of the cylinder barrel may be connected to, for instance, the boom of the excavator. By supplying hydraulic fluid into the cylinder barrel, the piston rod may be urged out of the cylinder barrel, thereby moving the boom into a desired position.

It is also known to provide the piston rod end extending out of the cylinder barrel with a thread disposed circumferentially about the piston rod end. The threaded piston rod end may, then, be screwed into a connecting element including a thread configured to screwable receive the piston rod end, thereby forming a preassembled arrangement. Then, for example, a clevis may be attached to the preassembled arrangement via at least one screw radially arranged around the connecting element. As the head of the piston rod contacts the bottom of the clevis, a gap between the clevis and the connecting element may be formed. However, the gap may be required for applying a pre-stressing force onto the thread of the piston rod end, thereby ensuring that the thread may not get loosened during operation.

Further, for example, U.S. Pat. No. 6,302,611 B1 discloses a connecting piece which can be pivotally connected both to a jib of an excavator and to a setting cylinder connected to the jib, and which is intended for linking up a tool, such as an excavator bucket, for example, to the end of the jib.

The present disclosure is directed, at least in part, to improving or overcoming one or more aspects of prior systems.

SUMMARY OF THE DISCLOSURE

According to an aspect of the present disclosure a hydraulic actuator may comprise a cylinder barrel, a piston rod reciprocally received by the cylinder barrel and having at least one first piston rod end extending out of the cylinder barrel, an intermediate element attached to the at least one first piston rod end by a first set of screws extending in a first direction, and a connecting element attached to the intermediate element by a second set of screws extending in a second direction opposite to the first direction.

According to another aspect of the present disclosure, a mining shovel may comprise at least one hydraulic actuator disclosed herein. In some embodiments, the mining shovel machine may be used for surface mining applications.

According to another aspect of the present disclosure, a method for assembling a hydraulic actuator including a cylinder barrel and a piston rod reciprocally received by the cylinder barrel and having at least one first piston rod end extending out of the cylinder barrel may comprise attaching an intermediate element to the at least one first piston rod end by a first set of screws extending into a first direction, and attaching a connecting element to the intermediate element by a second set of screws extending into a second direction opposite to the first direction.

In some embodiments, the connecting element may be configured to be attached to an element to be moved, such as, for example, a work implement or a boom of a construction machine or a mining shovel.

As used herein, the first direction of the first set of screws may be defined as the direction extending from a screw head to a screw thread. Similarly, the second direction of the second set of screws may also be defined as the direction extending from the screw head to the screw thread. In some embodiments, the first direction may also be defined as the direction of the pre-stressing force of the first and second sets of screws.

Other features and aspects of this disclosure will be apparent from the following description and the accompanying drawings.

DETAILED DESCRIPTION

Figure 1:
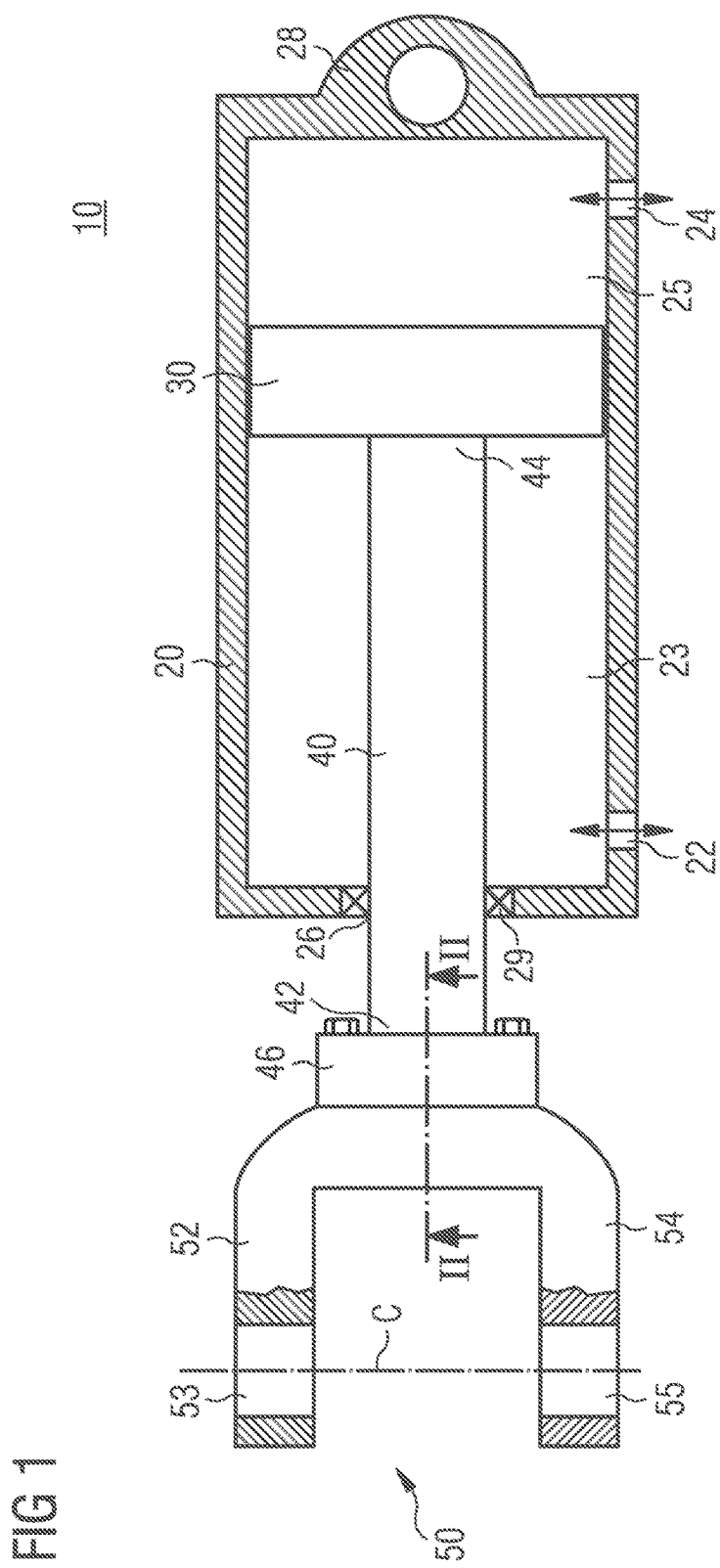
FIG. 1 is a schematic view of a hydraulic actuator including a clevis attached to a piston rod end via an intermediate element according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that mounting, for example, a clevis to a piston rod of a hydraulic actuator by connecting an intermediate element between the clevis and the piston rod with a first set of screws extending in a first direction and a second set of screws extending in a second direction opposite to the first direction may improve the distribution of forces and may lead to a defined and rigid connection of the clevis to the piston rod.

Referring to FIG. 1, a schematic view of a hydraulic actuator 10 is shown. The hydraulic actuator 10 includes a cylinder barrel 20, a piston 30 reciprocally disposed within the cylinder barrel 20, and a piston rod 40 having a first piston rod end 42 attached to an intermediate element 46 and a second piston rod end 44 attached to the piston 30. As further shown in FIG. 1, the intermediate element 46 is further attached to a connecting element 50 which may be, for example, a clevis configured to be attached to, for instance, a working implement such as a bucket of a mining shovel used in, for example, surface mining applications. For example, the piston rod 40 may include a circular cross-section having a diameter of, for example, about 100 mm to 300 mm, and the intermediate element 46 may include a diameter of, for instance, about 150 mm to 300 mm.

The piston 30 divides the inside of the cylinder barrel 20 into a first pressure chamber 23 and a second pressure chamber 25. The cylinder barrel 20 comprises a first opening 22 configured to connect the first pressure chamber 23 to a hydraulic system (not shown), and a second opening 24 configured to connect the second pressure chamber 25 to the hydraulic system. Thus, the hydraulic actuator 10 of FIG. 1 is illustrated as a double-acting differential actuator, which may be actuated by providing pressurized hydraulic fluid into the first pressure chamber 23 or the second pressure chamber 25. However, in some embodiments, the hydraulic actuator 10 may be a single-acting actuator including, for instance, only one of the first or second openings 22, 24.

The piston 30 is fixedly connected to the second piston rod end 44 by means of, for instance, forging. To the contrary, in some prior art applications, the piston is connected to the piston rod by means of screws. The first piston rod end 42 extends through a cylinder opening 26 of the cylinder barrel 20, such that the first piston rod end 42 extends out of the cylinder barrel 20. For sealing between the cylinder opening 26 and the first pressure chamber 23, a sealing 29 may be provided at the cylinder opening 26.

Opposite to the cylinder opening 26, the cylinder barrel 20 includes an attachment portion 28 configured to be attached to, for instance, a mining shovel.

In some embodiments, the hydraulic actuator 10 may comprise a further piston rod (not shown) which extends at the opposite side of the cylinder opening 26 through another cylinder opening. In such embodiments, the attachment portion 28 may be omitted and the cylinder barrel 20 may be attached via its cylindrical main body to its specific location of use.

As also shown in FIG. 1, the connecting element 50 is illustrated as a clevis. The connecting element 50 includes a first arm 52 and a second arm 54. The first arm 52 and the second arm 54 extend parallel to one another and may comprise a plate-like shaped structure. The first arm 52 includes a first opening 53, and the second arm 54 includes a second opening 55, which may be aligned to the first opening 53, which is indicated by an opening axis C in FIG. 1.

In some embodiments, the connecting element 50 may be an element which only comprises one arm having a bearing eye. In such case, no free portion between the first and second arms 52, 54 may be provided.

Figure 2:
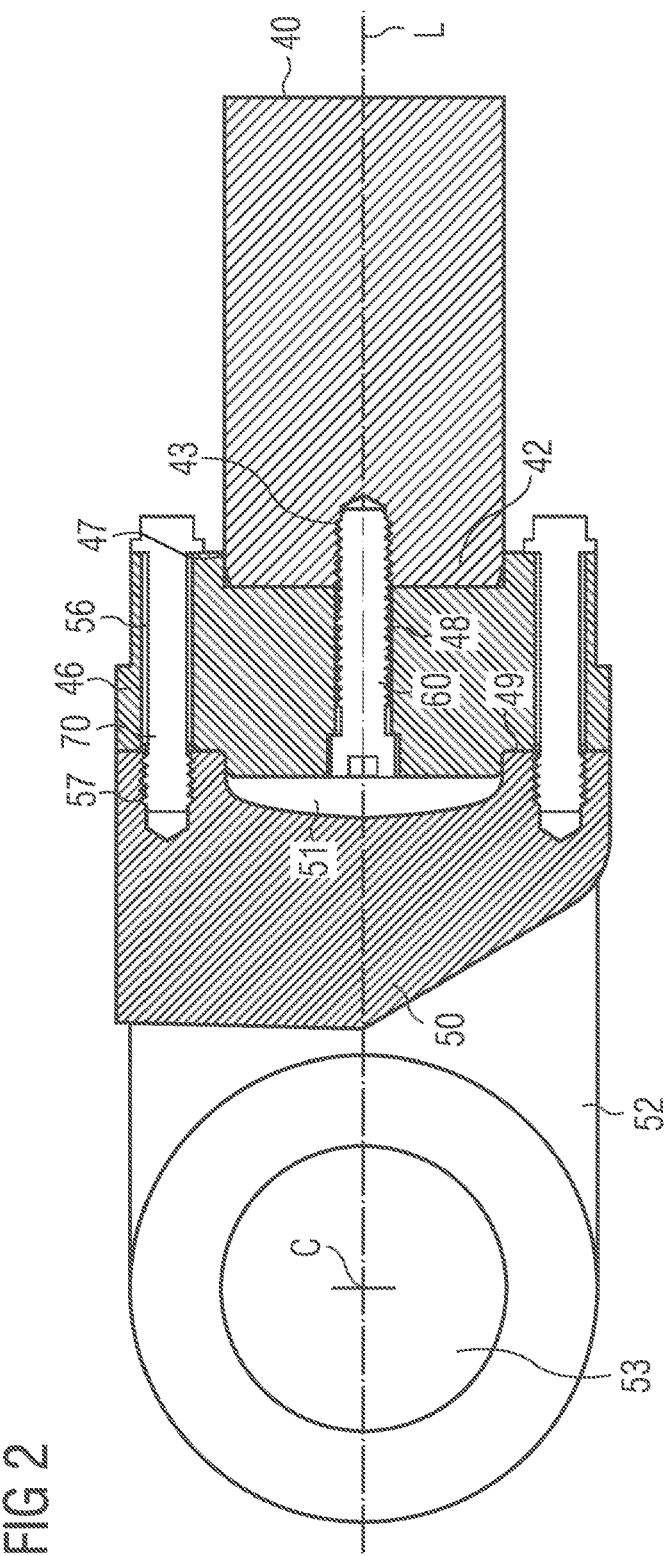
FIG. 2 is a cut view along a line II-II of FIG. 1, which illustrates the connection of the clevis to the piston rod end.

Turning now to FIG. 2, the connection of the connecting element 50 to the first piston rod end 42 via the intermediate element 46 is shown in greater detail. Particularly, FIG. 2 illustrates a cut view along a line II-II of FIG. 1.

As illustrated in FIG. 2, the intermediate element 46 is attached to the first piston rod end 42 via a first set of screws 60. In some embodiments, the intermediate element 46 is attached to the first piston rod end 42 via, for example, a first set of rivets, a first set of bolts and/or other fixing means suitable for rigidly attaching the intermediate element 46 to the first piston rod end 42. The first set of screws 60 may include a plurality of screws equally spaced and symmetrically arranged to each other.

The intermediate element 46 may include a piston rod receiving portion 47, which may be, for instance, a recess substantially corresponding to the shape of the first piston rod end 42. The piston rod receiving portion 47 may be configured to centrically position the first piston rod end 42 at the intermediate element 46.

The first set of screws 60 extends in a first direction from a side of the intermediate element 46 remote from the piston rod receiving portion 47 towards the first piston rod end 42 through at least one first bore 48, respectively. As illustrated in FIG. 2, the first direction may be defined by as direction from the screw head to the screw thread, for example.

Figure 3:
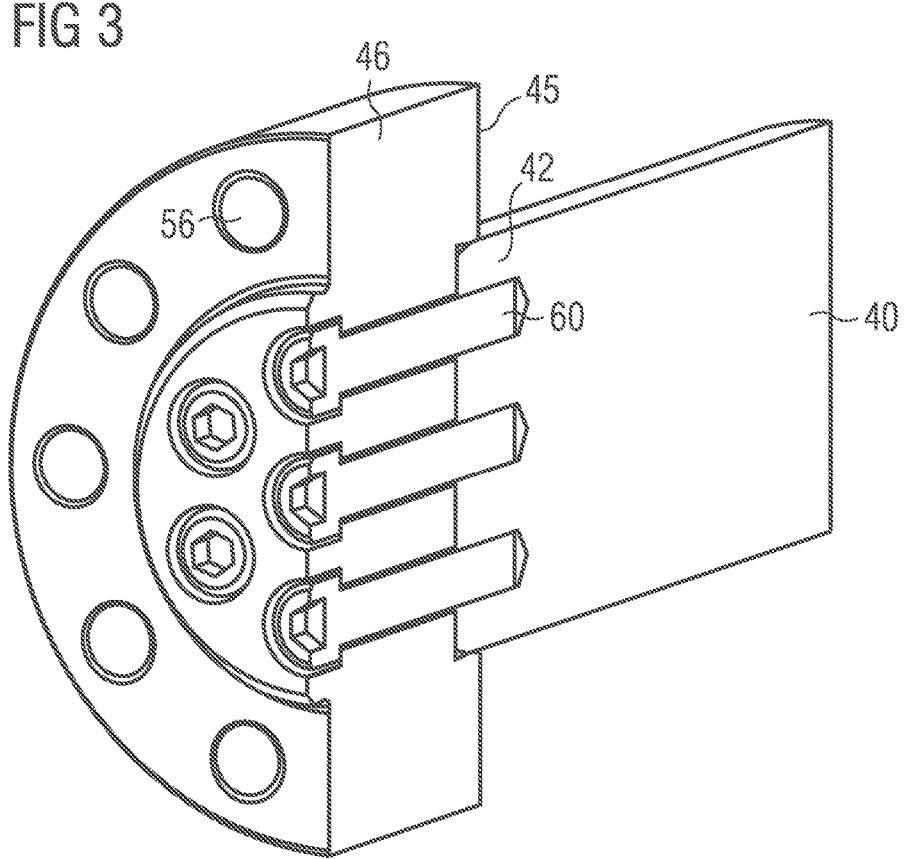
FIG. 3 is a perspective cut view of an intermediate element attached to the piston rod end.

The first piston rod end 42 may include a set of threaded bores 43 configured to receive the first set of screws 60, respectively. With reference to FIG. 3, for instance, the first set of screws 60 may include seven screws for rigidly attaching the intermediate element 46 to the first piston rod end 42. However, more or less than seven screws may be used for attaching the intermediate element 46 to the piston rod 40.

As also depicted in FIGS. 2 and 3, the screw heads of the first set of screws 60 may be countersunk in the intermediate element 46 for providing sufficient space for attaching the connecting element 50 to the intermediate element 46, which will be described in the following in greater detail.

As indicated in FIG. 2, the at least one first bore 48 may be disposed in a center portion of the intermediate element 46, which means a portion that is suitable for receiving the first set of screws 60 in order to fasten the piston rod 40 to the intermediate element 46.

Still referring to FIG. 2, the connecting element 50 is attached to the intermediate element 46 at a side opposite to the side where the intermediate element 46 is attached to the piston rod 40. The piston rod 40, the intermediate element 46, and connecting element 50 may be coaxially attached to one another with respect to a center axis L, which means that the piston rod 40, the intermediate element 46, and connecting element 50 are disposed next to another.

For ensuring the above, the connecting element 50 includes an intermediate element receiving portion 51 configured to at least partially receive a portion of the intermediate element 46. Specifically the intermediate element receiving portion 51 may be a recess into which a protrusion of the intermediate element 46 may be inserted, such that the intermediate element 46 is centrically received by the connecting element 50. Further, the intermediate element 46 may include a shoulder 49 for facilitating the centrically reception of the connecting element 50.

The intermediate element 46 may further include at least one second bore 56 configured to receive at least one screw of a second set of screws 70, respectively, which may be fixedly received by the connecting element 50. As shown in FIG. 2, the at least one second bore 56 may be disposed at the intermediate element 46 spaced apart in the circumferential direction about the center axis L. Hence, the at least one second bore 56 extends parallel to the center axis L. Further, as shown in FIGS. 2 and 3, the at least one second bore 56 is circumferentially disposed outwardly of the at least one first bore 48.

Figure 4:
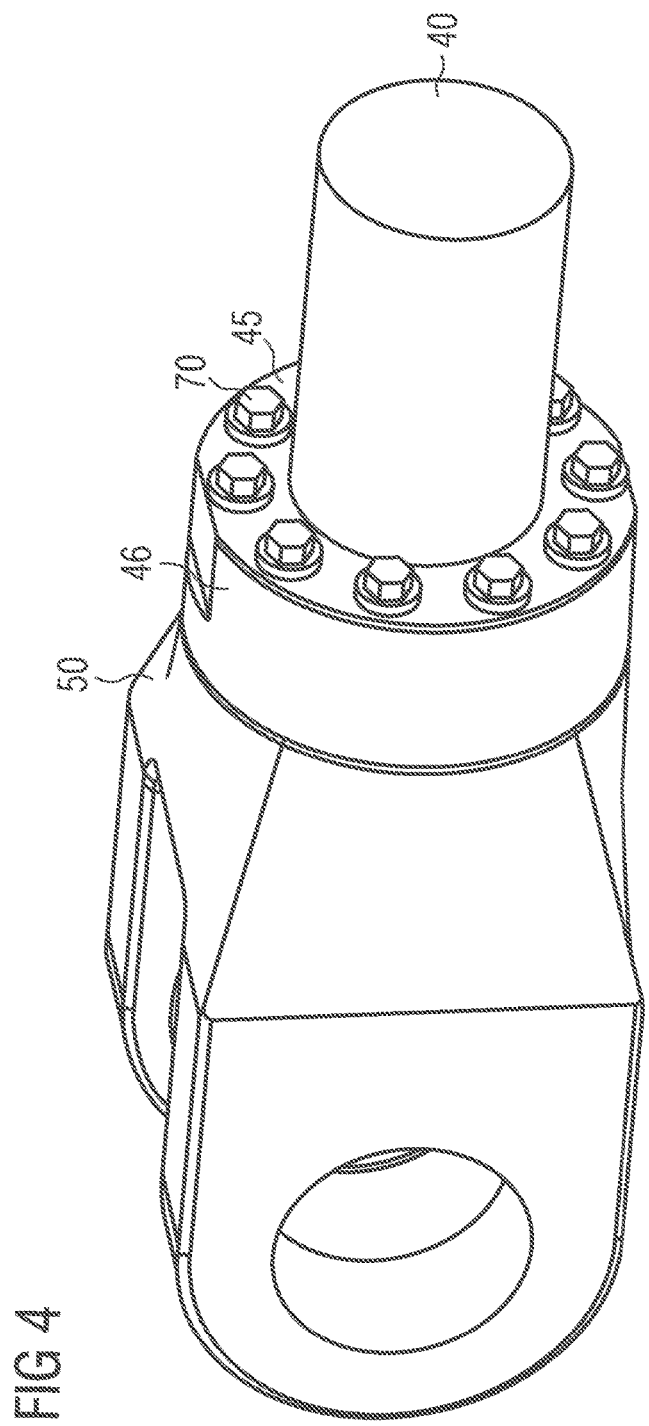
FIG. 4 is a perspective view of the clevis attached to the piston rod via the intermediate element.

The second set of screws 70 may include a plurality of screws equally spaced and symmetrically arranged to each other. As indicated in FIGS. 3 and 4, the second set of screws 70 may be circularly arranged with respect to the center axis L. In some embodiments, the intermediate element 46 may include flattened portions, wherein at least a portion of a flange portion 45 may not be accessible. In such case, the second set of screws 70 may only be provided where the flange portion 45 provides enough space for arranging the second set of screws 70. In some embodiments, the flattend portions may be on opposite side relatively to each other.

The distance between the bore axis of the at least one second bore 56 and the center axis L may be greater than the semidiameter of the first piston rod end 42. The intermediate element 46 may further include the flange portion 45 providing sufficient surface for the second set of screws 70. The flange portion 45 of the intermediate element 46 is also shown in FIG. 4 illustrating a perspective view of the connecting element 50 attached to the piston rod 40 via the intermediate element 46.

The connecting element 50 includes, for example, at least one threaded bore 57 configured to accommodate the second set of screws, respectively. As shown in FIG. 4, the intermediate element 46 may include ten second bores 56 configured to respectively receive ten screws of the second set of screws 70. However, the second set of screws 70 may also included more or less than ten screws.

The second set of screws 70 extends in a second direction from a side of the intermediate element 46 remote from the connecting element 50 towards the connecting element 50 through the at least one second bore 56 of the intermediate element 46. As illustrated in FIG. 2, the second direction may be defined by the direction from the screw head to the screw thread. Further, the first direction is opposite to the second direction, which means that the first direction is antiparallel to the second direction.

In some embodiments, the first direction may be defined by the direction of the pre-stressing force applied to the first set of screws 60 when mounting the intermediate element 46 to the first piston rod end 42, and the second direction may be defined by the direction of the pre-stressing force applied to the second set of screws 70 when mounting the connecting element 50 to the intermediate element 46. For example, with respect to FIG. 2, the direction of the pre-stressing force of the first set of screws 60 may extend from the left to the right, whereas the direction of the pre-stressing force of the second set of screws 70 may extend from the right to the left, which means opposite to one another.

INDUSTRIAL APPLICABILITY

In the following, a method for assembling, for example, a clevis to the piston rod 40 of the hydraulic actuator 10 is described in greater detail with reference to FIGS. 1 to 4.

At first, the piston rod 40 may be inserted into the cylinder barrel 20, such that the first piston rod end 42 extends out of the cylinder barrel 20 through the cylinder opening 26. Then, the intermediate element 46 is positioned on the first piston rod end 42, such that the first piston rod end 42 is disposed in the piston rod receiving portion 47 of the intermediate element 46. Then, the first piston rod end 42 is fastened to the intermediate element 46 via the first set of screws 60 which extend into the first direction.

Subsequently, the connecting element 50 is positioned on the intermediate element 46 at a side opposite to the side where the piston rod 40 is connected to the intermediate element 46. Then, the connecting element 50 is fastened to the intermediate element 46 via the second set of screws 70 which extend into the second direction opposite to the first direction.

For example, the first set of screws 60 and the second set of screws 70 may be screws ranging from M20 to M30. In some embodiments, the first and second set of screw 60, 70 may comprise a fine pitch thread and having a strength class of 10.9. In some embodiments, the first and second set of screws 60, 70 may include double hex head socket screws or double hex head screws with outer double hex heads. In some embodiments the first and second set of screws 60, 70 may include hex head socket screws or hex head screws with outer hex heads.

By mounting the connecting element 50, for example, a clevis to the piston rod 40 of the hydraulic actuator 10 as mentioned above, a rigid connection of the connecting element 50 to the piston rod 40 may be achieved. Further, as the connection of the connecting element 50 to the piston rod 40 is a defined connection, an improved distribution of forces exerting on the connecting element 50 may be achieved. For example, the exemplary disclosed hydraulic actuator 10, particularly the piston rod 40, may be configured to withstand forces in the range from, for instance, about 200 kN to about 6000 kN.

The exemplary disclosed hydraulic actuator may be used in a construction machine, such as, for example, wheel loaders, motor graders, backhoe loaders, skid steers, track-type tractors, tracked excavators, material handlers, cranes, and any other type of work machine with operator-controlled steering and travelling. In some embodiments, the exemplary disclosed hydraulic actuator may also be employed in mining shovels or rope shovels used in surface mining applications.

The exemplary disclosed hydraulic actuator may be configured to actuate and move an element to which the connecting element is configured to be connected. For example, the exemplary disclosed hydraulic actuator may be configured to move a boom, a stick, and/or a work implement attached to the end of the stick. The boom may be pivotably attached to a superstructure of the construction machine as known in the art. The exemplary disclosed hydraulic actuator may also be used as a boom actuator attached to the superstructure and the boom, such that a distal end of the boom may be raised and lowered by actuation of the disclosed actuator. In such case, the connecting element may be connected to the boom, whereas the attachment portion may be connected to the superstructure.

Although the preferred embodiments of this invention have been described herein, improvements and modifications may be incorporated without departing from the scope of the following claims.

The invention claimed is:
1. A hydraulic actuator comprising:
a cylinder barrel;
a piston rod reciprocally received by the cylinder barrel and having a first piston rod end extending out of the cylinder barrel;
an intermediate element in direct contact with the first piston rod end and rigidly attached to the first piston rod end by a first set of screws extending in a first direction through the intermediate element and fixedly received by piston rod threaded bores in the first piston rod end; and
a connecting element in direct contact with the intermediate element and rigidly attached to the intermediate element by a second set of screws extending in a second direction opposite to the first direction through the intermediate element and fixedly received by connecting element threaded bores in the connecting element.

2. The hydraulic actuator of claim 1, wherein the connecting element is a clevis configured to be connected to an implement of a mining shovel.

3. The hydraulic actuator of claim 1, wherein the intermediate element includes a piston rod receiving portion recessed within the intermediate element and configured to receive and engage the first piston rod end to centrically position the first piston rod end relative to the intermediate element.

4. The hydraulic actuator of claim 1, wherein the connecting element includes an intermediate element receiving portion recessed within the connecting element and configured to receive and engage the intermediate element to centrically position the intermediate element relative to the connecting element.

5. The hydraulic actuator of claim 1, further comprising a piston reciprocally disposed within the cylinder barrel and attached to a second piston rod end opposite to the first piston rod end, the piston being configured to divide the cylinder barrel into a first pressure chamber and a second pressure chamber.

6. The hydraulic actuator of claim 1, wherein the first set of screws includes a plurality of screws equally spaced and symmetrically arranged to each other.

7. The hydraulic actuator of claim 1, wherein the second set of screws includes a plurality of screws equally spaced and symmetrically arranged to each other.

8. The hydraulic actuator of claim 1, wherein the hydraulic actuator is a double-acting differential hydraulic actuator.

9. The hydraulic actuator of claim 1, wherein the intermediate element includes at least one first through bore disposed in a center region of the intermediate element and configured to accommodate the first set of screws, and at least one second through bore circumferentially disposed outwardly with respect to the at least one first bore and configured to accommodate the second set of screws.

10. The hydraulic actuator of claim 1, wherein the piston rod, the intermediate element, and the connecting element are substantially coaxial to one another.

11. A method for assembling a hydraulic actuator including a cylinder barrel and a piston rod reciprocally received by the cylinder barrel and having a first piston rod end extending out of the cylinder barrel, the method comprising:
rigidly attaching an intermediate element to the first piston rod end by a first set of screws extending into a first direction, wherein the intermediate element is in direct contact with the first piston rod end and the first set of screws extend through the intermediate element and are fixedly received by piston rod threaded bores in the first piston rod end; and
rigidly attaching a connecting element to the intermediate element by a second set of screws extending into a second direction opposite to the first direction, wherein the connecting element is in direct contact with the intermediate element and the second set of screws extend through the intermediate element and are fixedly received by connecting element threaded bores in the connecting element.

12. The method of claim 11, wherein rigidly attaching the intermediate element includes inserting the piston rod end in a piston rod receiving portion recessed within the intermediate element and engaging the first piston rod end to centrically position the first piston rod end relative to the intermediate element.

* * * * *